W. M. HEINA.
RESILIENT TIRE.
APPLICATION FILED APR. 21, 1914.
1,106,302.
Patented Aug. 4, 1914.
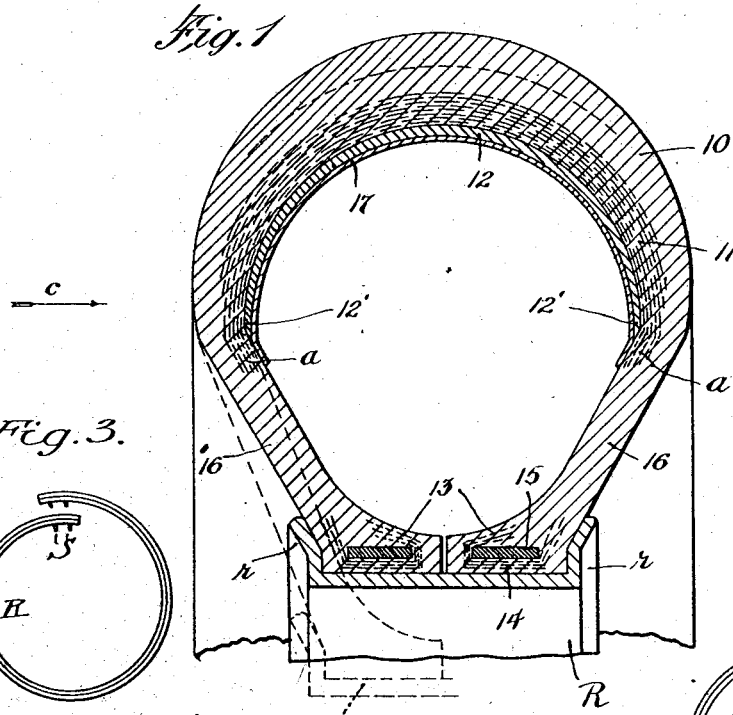
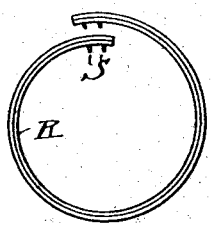
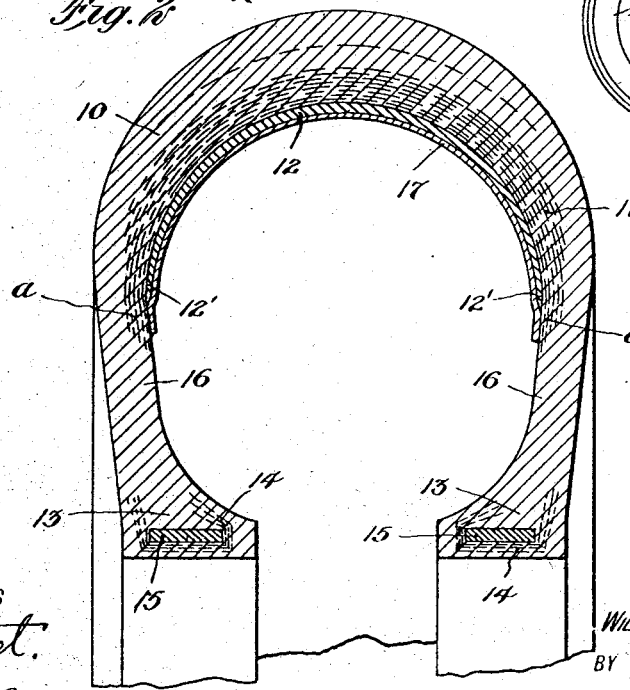
WITNESSES
F. D. Sweet.
Geo. L. Beeler
INVENTOR
WILLIAM M. HEINA
BY
ATTORNEYS

UNITED STATES PATENT OFFICE.

WILLIAM M. HEINA, OF NEW YORK, N. Y., ASSIGNOR OF TWENTY-THREE AND ONE-THIRD ONE-HUNDREDTHS TO ERNEST V. DERKS AND TWENTY-THREE AND ONE-THIRD ONE-HUNDREDTHS TO EDWARD KAMMLER, BOTH OF NEW YORK, N. Y., AND TWENTY-THREE AND ONE-THIRD ONE-HUNDREDTHS TO AUGUST R. SOUTHWORTH, OF WESTWOOD, NEW JERSEY.

RESILIENT TIRE.

1,106,302. Specification of Letters Patent. Patented Aug. 4, 1914.

Application filed April 21, 1914. Serial No. 833,381.

*To all whom it may concern:*

Be it known that I, WILLIAM M. HEINA, a citizen of the United States, and a resident of the city of New York, borough of Manhattan, in the county and State of New York, have invented a new and Improved Resilient Tire, of which the following is a full, clear, and exact description.

This invention relates to resilient wheels and has particular reference to resilient tires.

Among the objects of this invention is to provide a resilient tire for a vehicle wheel, the same simulating in size, weight, appearance and utility, the standard forms of pneumatic tires of such wheels.

A further object of the invention, however, is to provide a resilient tire of such a character that in addition to the above features it will be strong and hence more reliable in use than the usual pneumatic tires.

More specifically stated, this invention comprises a tire construction, having embedded in its tread portion, or formed within it in any suitable way, a continuous metallic ring or rim which is or may be practically non-elastic and of circular arc shape in cross section, serving to sustain the weight of the load and prevent serious damage to the flexible portions of the structure.

The foregoing and other objects of the invention will hereinafter be more fully described and claimed and illustrated in the drawings forming a part of this specification in which like characters of reference indicate corresponding parts in both the views, and in which—

Figure 1 is a vertical transverse section of a tire embodying the principal features of this invention, the same being shown connected to a wheel rim of conventional design; Fig. 2 is a similar view of the tire in its normal form or before being applied to the wheel rim. Fig. 3 is a detail view indicating one of the many forms of rims which may be used in carrying out the invention; and Fig. 4 is a view of the same in assembled position and indicating its relation to the felly.

The several parts of the device may be made of any suitable materials, and the relative sizes and proportions, as well as the general design of the mechanism, may be varied to a considerable extent without departing from the spirt of the invention hereinafter more fully set forth and specifically claimed.

Referring more particularly to the drawings, I show, by way of illustration of one means for carrying out this invention but without unnecessarily restricting the invention, a wheel rim R of any suitable form and having, as an illustration of tire securing means, a pair of outwardly projecting side flanges $r$.

My improved tire, as above premised, has the appearance, as to size and form, of a common straight side or clencher pneumatic tire, and is adapted therefore to be detachably secured upon the rim R as above described from which it may be readily removed for any desired purpose.

My tire construction comprises a comparatively thick tread portion 10 comprising a mass 11 of fabric, canvas or any other suitable tough, flexible but non-elastic material. This mass of non-elastic material extends transversely of the tread of the tire from about the point $a$ on one side to a similar point on the other side. The body of the tread is composed preferably of live flexible rubber of good quality, the rubber being impregnated thoroughly in and through the mass of reinforcement 11. This mass may extend radially outwardly as far as desired toward the outer surface of the tread, depending upon the character of the reinforcement. It, therefore, receives and sustains the direct wear upon the roadway.

At 12 I show a rigid metallic rim of circular form and continuous in extent around and spaced from the wheel rim R. As indicated, the rim or ring 12 is substantially semicircular in cross section, but being preferably reduced in thickness at or toward its side edges 12'. The tread portion of the tire is preferably cemented or otherwise securely fastened to the outer surface of the ring 12, and as shown, the reinforcement mass 11 extends over the edges 12 of said ring and inwardly therefrom. That is to say, the ends or edges $a$, $a$ of the reinforcement extend radially inwardly beyond the edges of the metal ring and hence there is no distortion or displacement of any part of the tread with respect to the ring because or stretch or elasticity.

At 13 I show securing or anchorage members for direct coöperation with the wheel rim. These anchor members, as to their form and appearance, as well as their relation to the wheel rim, do not vary materially from corresponding anchor members of the usual pneumatic tires. In other words, my invention does not comtemplate any particular form, size or dimensions of these anchor members since they will be made to correspond to the character of the rim to which they are to be secured and the particular means for locking the same to the rim. Suffice it to say, however, that each of these anchors is provided with any suitable form or construction of reinforcement 14 of fabric, cordage or the like, constituting the main body of the member and also it may be provided with a strip of metal as indicated at 15.

The same body of live rubber above referred to as impregnating the tread reinforcement is continued inwardly, forming at 16 strong continuous webs of solid pure rubber. These webs constitute the only connections between the anchor members 14 and the tread portions of the tire, and they extend circumferentially around the wheel without a break or opening. The natural form or position of the webs or anchor members is shown in Fig. 2, from which it will be understood that the webs tend to hold the anchor members spaced at suitable distances from each other, and the webs tend to contract or shorten radially as therein indicated. In mounting the tire, therefore, upon the wheel rim, the webs 16 are put under considerable stretch, the immediate effect of which is to hold the ring and tread portions of the tire in a substantially definite relation to the wheel rim and concentric therewith. As indicated at 17, I may provide an inner coating or lining of any suitable fabric or thin material serving as a finishing member covering the inner surface of the metal ring, the side edges of the coating being extended inwardly toward the anchor members preferably only as far as the points a, a, so as not to be subjected to the stretching effect of the webs 16. Since the anchor members 13 are provided with non-elastic cores or strengthening strips 15, one means of mounting the same upon the rim R consists in making the rim split transversely whereby one of the ends thereof may be drawn within the other, as shown in Fig. 3, so as to contract the rim as a whole sufficiently to allow the improved tire to slip readily over the rim and between the flanges r. After the tire is put in place, the ends of the rim R are caused to come into normal abutting position, as shown in Fig. 4, where they are locked by means of a plate P which slips over a plurality of studs S secured to the rim ends. Said studs coöperate with the plate P to hold the rim ends in proper position, and the studs coöperate with the felly F to prevent the plate from displacement and also to prevent the creeping of the rim and tire circumferentially of the felly.

With the tire construction as herein set forth and connected to the wheel by any suitable means and with the anchor members 13 locked so as not to become displaced outwardly from the rim R, the operation of the tire may be briefly summarized as follows: The load being supported directly upon the hub and wheel rim R in the usual manner, and the improved tire construction including the rigid ring 12 resting upon the ground, the load ultimately will be supported by the flexible webs 16. While the direct strain will be between the wheel rim R and the upper portion of the tire tread, yet the strain will be distributed throughout practically the whole circumference of the tire. The strain at the top of the wheel will be substantially radial, while at the sides of the wheel the strains will be downward or tangential of the wheel rim. In other words, the webs 16 will be subjected to a strain or stretch at every point except at the bottom where they will be allowed to contract slightly due to the relief from the normal stretch placed upon the webs when the tire is assembled upon the rim. The dotted lines in Fig. 1 indicate the tendency of the rim R to put the webs 16 under stretch at the top of the wheel under maximum strain.

Buckling of this tire, due to skidding or the like, is practically impossible for two important reasons; first, buckling is directly resisted by the tensile strength of the web 16 on the opposite side of the tire from the obstacle being encountered by the tire. In other words, should the vehicle skid in such a direction as to cause an obstacle to act in the direction of the arrow c, tending to throw the tread portion of the tire toward the right in Fig. 1, the web 16 on the right hand side would be put under an unusual strain, and the webs are so designed or constructed that the strength thereof will be exerted to resist all of such strain in a practical manner. Secondly, an obstacle, such as a curbstone or the like, struck by a skidding wheel having a usual form of pneumatic tire, will cause the buckling of such tire locally, that is to say, a very short portion of the circumference of the tire will be called upon to resist the effect of such obstacle. In this improved tire, however, the strong rigid ring 12 will distribute throughout practically the whole of the tire the shock or unusual strain to which the wheel may be thus subjected in practice, and hence the danger of stripping the tire from the wheel will be practically eliminated. Furthermore, it will be observed that since this tire is not pneumatic in the sense that it is not inflatable, there is never any reason to stop for such repairs as are incident to leaks, blowouts or the like. Because of the peculiar construction of the tread, it is able to withstand such cuts, punctures, or the like, as would disable a pneumatic tire, and, furthermore, a puncture of either web 16 would not seriously impair the usefulness of the device.

By the illustrated construction of tire I produce a tire whose crown portion or tread is reinforced so as to prevent its extension or increase in length transversely. It will be noticed also that the free portions or ends of the side wings are prevented from radial expansion or outward movement, and the said side wings between their free ends and the tread reinforcing means are of elastic rubber. In addition, I provide within the tire a member in the nature of a spreader which is substantially rigid and which spreads the crown portion of the tire to such extent relatively to the free ends of the wings, that the elastic portions of the wings will be stretched and will incline inwardly from the sides of said spreading member when applied to a rim. Now then it will be noticed that in adjusting the tire from the expanded position shown in Fig. 2 to the position shown in Fig. 1 in which it is fitted to the rim, the free ends of the wings are brought toward each other and since these free ends cannot be expanded outwardly and the tread of the tire by reason of its reinforcement cannot be extended, the movement of the free ends of the wings toward each other puts the side wings under tension and by reason of the spreader causes said wings to incline inwardly toward their free ends so that the tire will operate advantageously when applied to a rim, as hereinbefore more fully described.

Having thus described my invention, I claim as new and desire to secure by Letters Patent:—

A tire substantially as herein described, having a crown portion and side portions or wings, the latter being normally separated from each other at their inner ends and movable at such ends toward each other, means in the crown portion for preventing the extension thereof, means at the free ends of the side portions or wings for preventing the same from radial outward expansion, the side portions or wings between the means for preventing radial expansion and the said means for preventing extension being of elastic rubber, and the free portions of the ends of the wings being spread substantially apart prior to the application of the tire to a rim, and a substantially rigid member for spreading the crown portion of the tire to such extent relatively to the free ends of the wings that the elastic portions of the wings will be stretched and inclined inwardly from the sides of said spreading inwardly from the sides of said spreading member when applied to a rim, the side portions or wings being thus put under tension, as and for the purpose set forth.

In testimony whereof I have signed my name to this specification in the presence of two subscribing witnesses.

WILLIAM M. HEINA.

Witnesses:
 GEO. L. BEELER,
 PHILIP D. ROLLHAUS.